United States Patent [19]
Johanson

[11] Patent Number: 6,014,489
[45] Date of Patent: Jan. 11, 2000

[54] LIGHT DISTRIBUTING TUBES AND METHODS OF FORMING SAME

[76] Inventor: Walter A. Johanson, 250 E. 5th St., #401, St. Paul, Minn. 55101

[21] Appl. No.: 08/975,339

[22] Filed: Nov. 20, 1997

Related U.S. Application Data

[60] Provisional application No. 60/050,021, Jun. 13, 1997.

[51] Int. Cl.[7] ................................................ G02B 6/00
[52] U.S. Cl. ........................ 385/133; 385/147; 385/125; 362/331
[58] Field of Search ................................ 385/130, 133, 385/37, 42, 43, 147, 125; 362/330, 329, 331

[56] References Cited

U.S. PATENT DOCUMENTS

| | | | |
|---|---|---|---|
| 3,312,853 | 4/1967 | Mela et al. | 313/632 |
| 3,902,056 | 8/1975 | Aizenbert et al. | 359/597 |
| 4,112,335 | 9/1978 | Gonser | 313/111 |
| 4,229,658 | 10/1980 | Gonser | 313/570 |
| 4,260,220 | 4/1981 | Whitehead | 385/133 |
| 4,420,740 | 12/1983 | Brown et al. | 362/391 |
| 4,422,719 | 12/1983 | Orcutt | 385/123 |
| 4,542,449 | 9/1985 | Whitehead | 362/330 |
| 4,615,579 | 10/1986 | Whitehead | 385/133 |
| 4,750,798 | 6/1988 | Whitehead | 385/133 |
| 4,787,708 | 11/1988 | Whitehead | 385/133 |
| 4,791,540 | 12/1988 | Dreyer, Jr. et al. | 362/331 |
| 4,805,984 | 2/1989 | Cobb, Jr. | 385/133 |
| 4,834,495 | 5/1989 | Whitehead et al. | 385/133 |
| 4,850,665 | 7/1989 | Whitehead | 385/133 |
| 5,016,143 | 5/1991 | Aikens | 362/560 |
| 5,095,415 | 3/1992 | Anderson et al. | 362/331 |
| 5,109,465 | 4/1992 | Klopotek | 385/133 |
| 5,117,478 | 5/1992 | Cobb, Jr. et al. | 385/133 |
| 5,195,162 | 3/1993 | Sultan et al. | 385/130 |
| 5,219,217 | 6/1993 | Aikens | 362/32 |
| 5,339,382 | 8/1994 | Whitehead | 385/133 |
| 5,475,785 | 12/1995 | Johanson | 385/133 |
| 5,483,119 | 1/1996 | Johanson | 313/498 |
| 5,832,164 | 11/1998 | Miekis | 385/133 |

FOREIGN PATENT DOCUMENTS

| | | |
|---|---|---|
| 0003312 | 3/1981 | European Pat. Off. . |
| 0046939 | 5/1983 | European Pat. Off. . |
| 0125558 | 11/1984 | European Pat. Off. . |
| 0235447 | 9/1987 | European Pat. Off. . |
| 0236030 | 9/1987 | European Pat. Off. . |
| 0290276 | 11/1988 | European Pat. Off. . |
| 305899 | 5/1918 | Germany . |
| 7106262 | 4/1978 | Germany . |
| 2920204 | 4/1980 | Germany . |
| 3009171 | 9/1981 | Germany . |
| 8228416 | 3/1984 | Germany . |
| 3804732 | 8/1989 | Germany . |
| 2044908 | 7/1981 | United Kingdom . |
| 2112166 | 11/1982 | United Kingdom . |
| 2145760 | 3/1985 | United Kingdom . |
| 9004132 | 4/1990 | WIPO . |

OTHER PUBLICATIONS

Patent Abstracts of Japan, vol. 8, No. 129 (P–280) (1566), Jun. 15th 1984: & JP–A–59 33 402 (Takashi Mori) Feb. 23, 1984 (Abstract).

Applied Optics, vol. 21, No. 15, Aug. 1982, pp. 2755–2757, Optical Society of America, New York, U.S.; L.A. Whitehead, et al.: "New Efficient LIght Quide for Interior Illumination", Figures 1, 2, abstract, p. 2755, left–hand.

*Primary Examiner*—Hemang Sanghavi
*Attorney, Agent, or Firm*—Galgano & Burke

[57] ABSTRACT

Method and apparatus for forming hollow tubular light-distributing tubes for area illumination along the length of the tubes from a beam of light introduced into one end. Within the tube is a geometrically complex, 3-dimensional light redirecting structure traversing the light beam along the full length of the tube to redirect the light beam proportionately along the length of tube through a window formed therein. Both the tube and the light-redirecting structure can be formed as an integrated flat, substantially void-free structure for shipping and then converted in situ to the operative, 3 dimensional configuration.

25 Claims, 13 Drawing Sheets

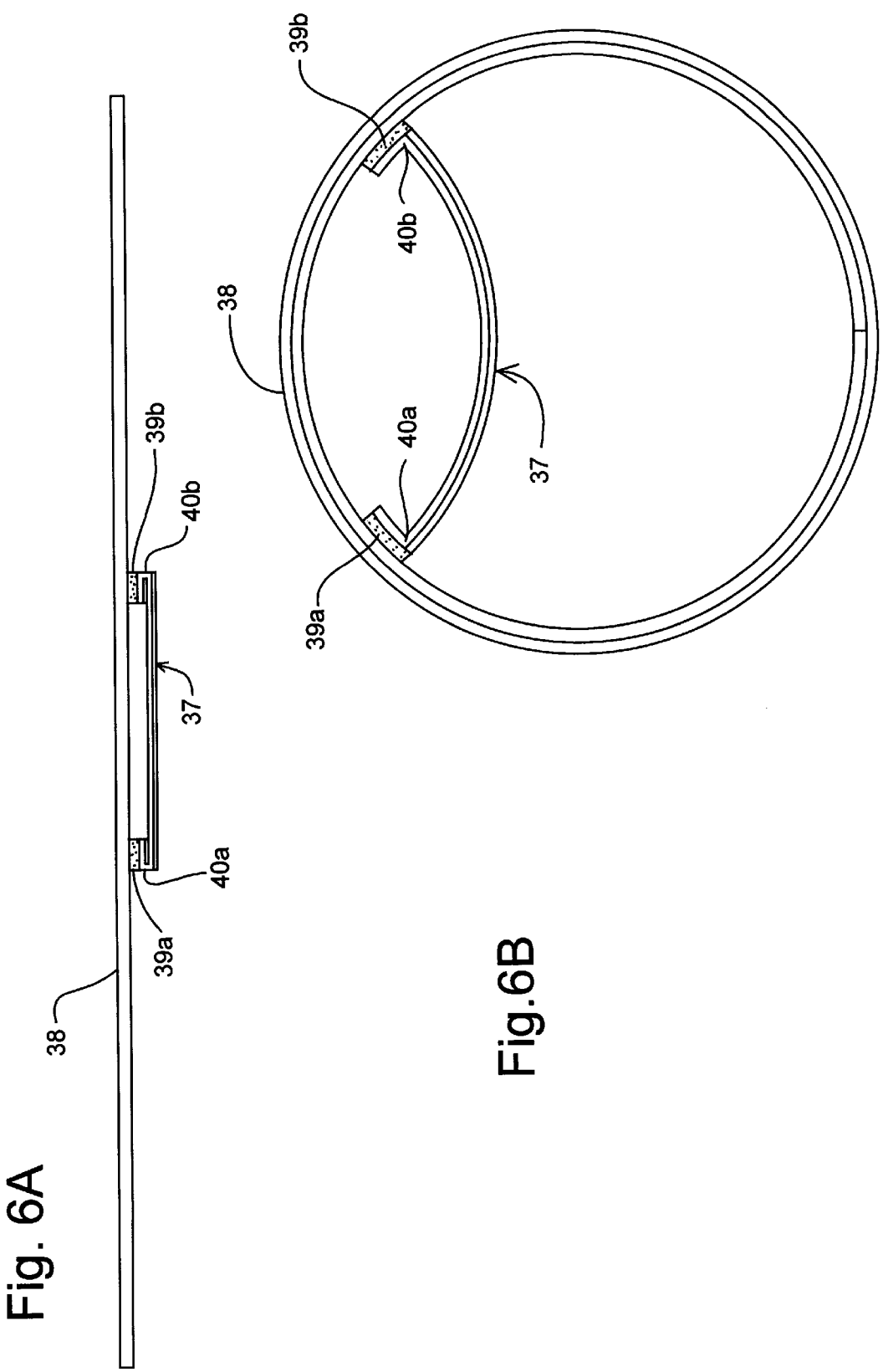

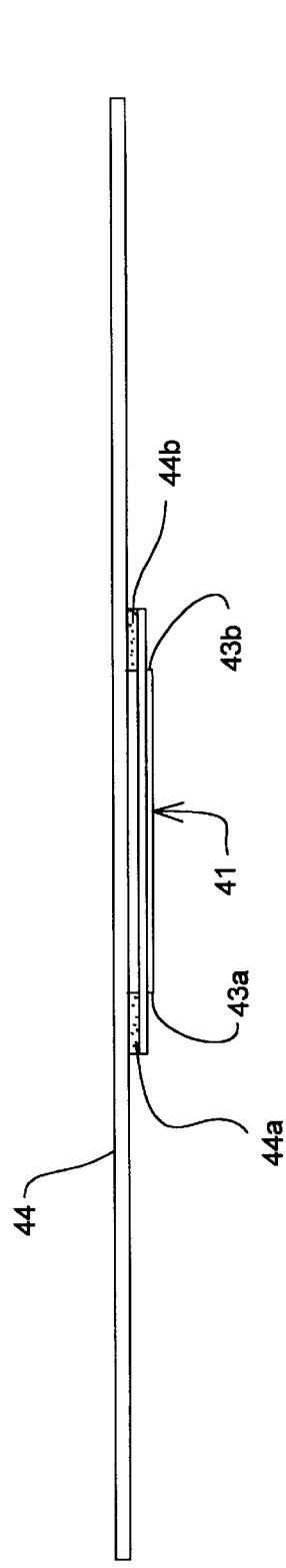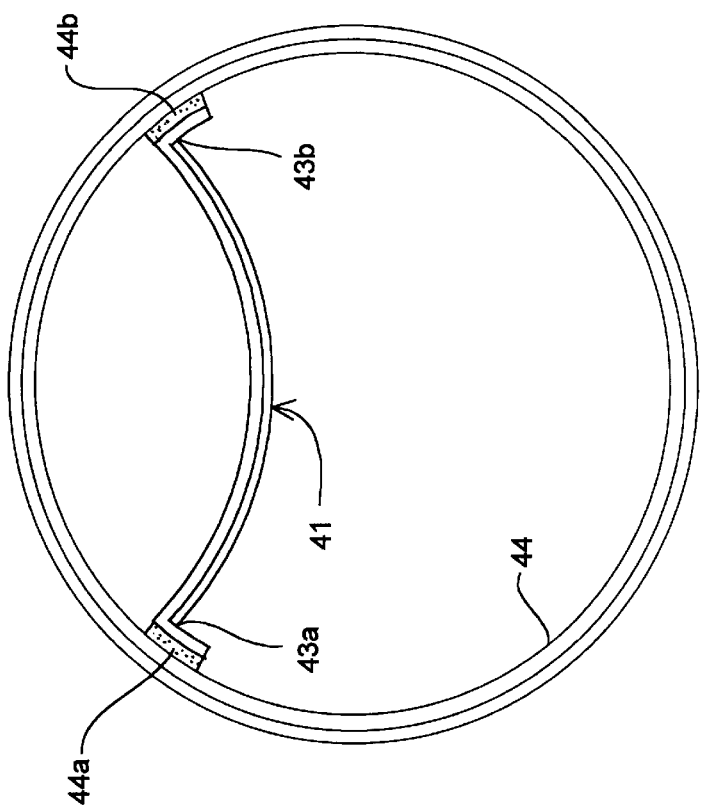
Fig. 7A
Fig. 7B

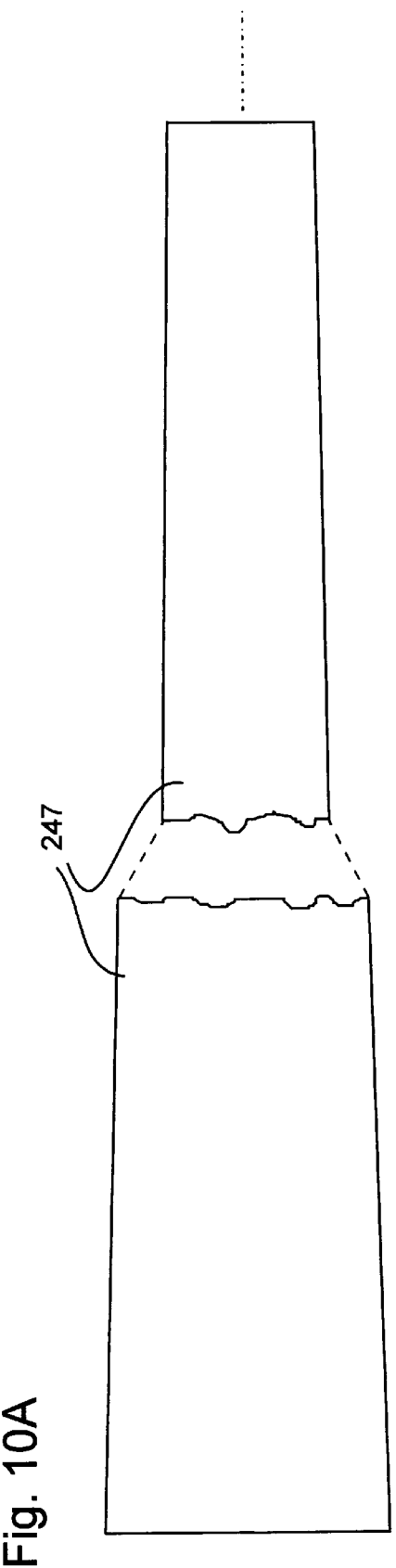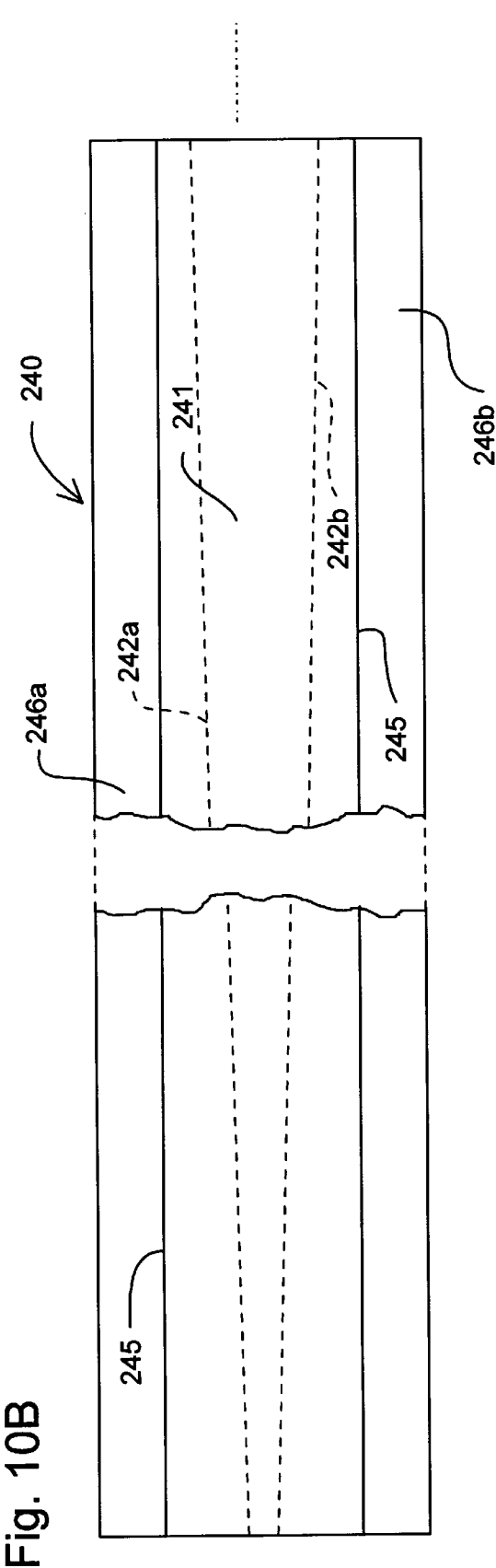
Fig. 10A
Fig. 10B

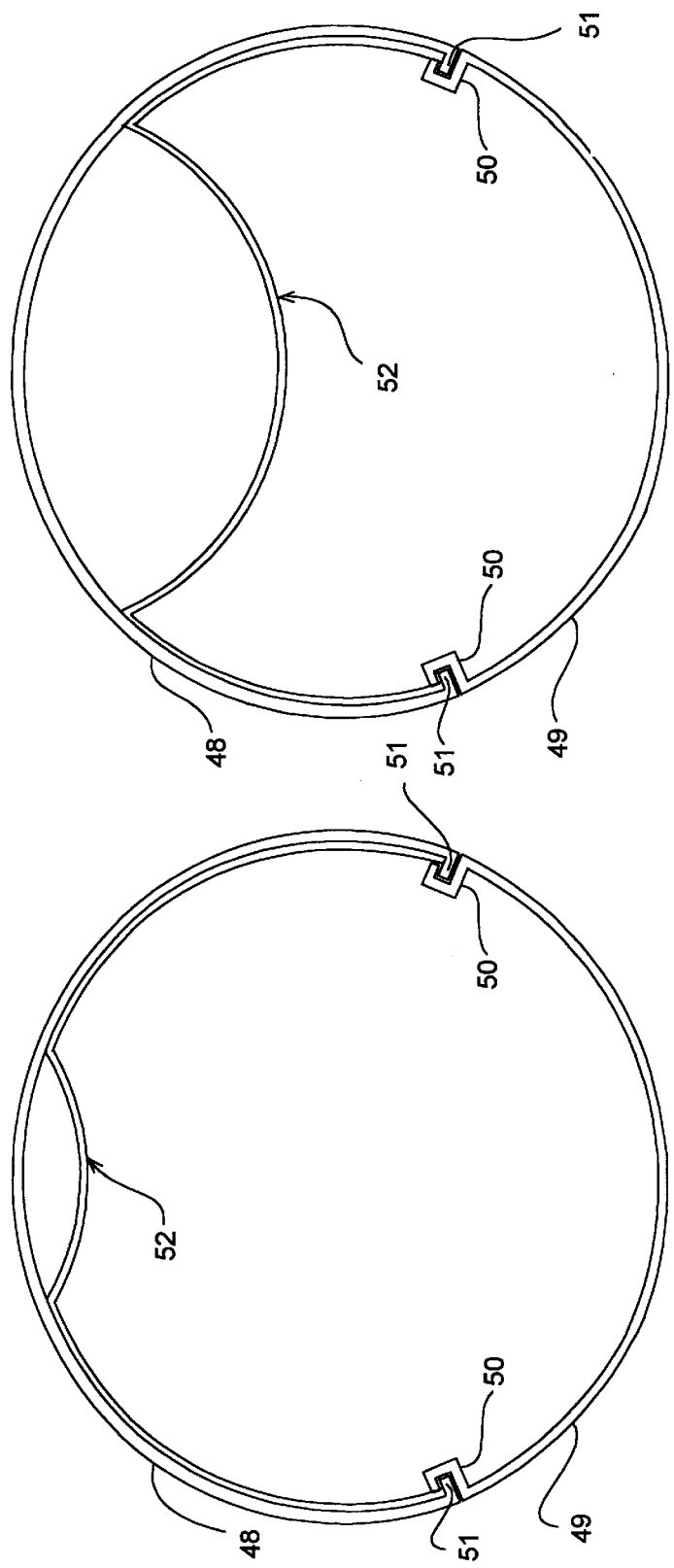

LIGHT DISTRIBUTING TUBES AND METHODS OF FORMING SAME

This application claims the benefits of U.S. Provisional Application No. 60/050,021 filed on Jun. 13, 1997.

FIELD OF INVENTION

The present invention is directed to light distributing tubes for area illumination along the length of such tubes from a substantially focused beam of light.

BACKGROUND OF THE INVENTION

The technology of hollow light guiding tubes based on optical prisms and polished planar surfaces, U.S. Pat. No. 4,260,220, is in practice, marginally efficient and limited in its commercial applications. The production, in volume, of micro-prism optical light film by replicating a myriad of optical prisms on one side and a polished surface on the other, and made of thin, flexible, transparent polymeric material by 3M Company, St. Paul, Minn. generated the impetus which brought about the development of optical prism light guiding tubes into optical prism light-distributing tubes, which if efficient and cost effective, could have commercial significance. A representative sampling of the presently evolved state of the art for optical prism light-distributing tubes using prism optical light film is shown in the following sample of U.S. Pat. Nos.: 4,542,449; 4,615,579; 4,750,798; 4,787,708; 4,791,540; 4,805,984; 4,834,495; 4,850,665; 5,475,785; and 5,483,119.

The present invention is based on the premise that prism controlled light-guidance and prism controlled light-distribution in the same tube at the same time are antithetical functions which simply get into each other's way at the cost of efficiency. Thus, the merger of simple light-guidance by tubes using prismatic optical light film into a new and more complex art of light-distribution by tubes also using the prismatic film was an illogical, if not costly mistake for those enticed into the field. This, coupled with the facts that optical light film: (i) cannot guide light beams having angles of incidence over 27.6 to 29.5 degrees; (ii) cannot distribute light beams having angles of incidence less than 27.6 to 29.5 degrees; (iii) is delicate to handle and easily damaged, even by a casual finger print; (iv) cannot be curved into small radii, (v) degrades, in its preferred polycarbonate form, in the presence of ultra violet light; (vi) becomes dysfunctional in the presence of moisture and dust; and (vii) is, at least at this point in time, disproportionately expensive relative to the sum of all other components of which the tube is constructed, all invite other and better solutions than prismatic optical light film to the problem of distributing light from a concentrated source by means of long tubes.

It is therefore an object of the present invention to provide efficient light-distributing tubes which do not require in any way the optics of prismatic film.

It is another object of the invention to provide light-distributing tubes which include a light redirecting structure within the tube which can nevertheless be fabricated in a flat, substantially void-free configuration for inexpensive handling and shipping, but which can be easily converted in situ to its fully operative configuration.

It is another object of the invention to provide efficient, inexpensive, durable, environmentally stable light-distributing tubes.

It is another object of the invention to provide a light-distributing tube which can distribute most of the light injected into the tube on the first pass of the light down the tube.

SUMMARY OF THE INVENTION

In accordance with one embodiment of the invention, a tubular external supporting shell, preferably cylindrical, can be formed of one or more plies of sheet material, each joined edge to longitudinal edge, to define an internal column into which a substantially focussed beam of light from a concentrated source is axially projected. For most applications, e.g. ceiling-supported light fixtures, it is preferred that the light be distributed evenly from the bottom of the tube through a light-permeable window extending the length of the tube and subtending an arc of about 90°–180°, for example, 140 degrees in the cylinder and centered at the bottom thereof. To this end and to contain the light above the window, a highly light-reflective and relatively non light-absorptive layer can be included as a ply in the tube surrounding the innermost, smooth, glossy and light-transparent ply.

According to this embodiment, contained and supported within the tubular shell to intercept the light beam is a light-redirecting structure, preferably of highly light-scattering material, in contoured strip form having an extremely shallow angle of declivity beginning at the upper surface of the tube close to the light input end and inclining downward to a point near the lower surface of the tube at its distal end. The light redirecting structure is most preferably not only highly light scattering but also highly light reflecting. The strip can be convexly, transversely curved on a radius approximating that of the cylindrical tube and is preferably proximate to both edges to the inner wall of the tube thereby eclipsing successively larger portions of the tube interior to intercept portions of the light beam. A preferred strip is relatively narrow at the light-input end and widens until it reaches the distal end where it eclipses most preferably about two-thirds to about three-quarters of the cylindrical cross section of the tube. Along its length the light redirecting structure gradually changes in its cross sectional shape from a small prolate ellipsoid toward the light input end of the tube to a larger, oblate ellipsoid approaching full circular cross section which substantially fills the cylindrical carrier shell toward the distal end.

The entire light redirecting structure is preferably secured internally only to the upper half of the tube so that when the tube is in a flat or shipping configuration the light redirecting structure will also be flat and substantially void-free, but when the tube is formed the internal structure will simultaneously form itself into its operative form. In some instances, the light redirecting structure must be popped down.

Long tubes having high ratios of length to diameter (the aspect ratio) can be formed in sections joined end to end, in which case each section will contain a portion of the light redirecting structure which is unique to that section so that the gentle slope of the light redirecting surface will be continuous and unbroken along the full length of the tube. While preferably continuous, the slope of the light redirecting structure is not necessarily constant.

The light beamed into the tube is preferably substantially focused and accurately directed axially into the tube. A combination of a precision compound parabolic reflector for the light source and supplementary focussing lenses should assure the desired sharpness of focus.

Various embodiments of the present invention are adapted for use with rigid, extruded, cylindrical tubes of transparent plastic as the carrier structure. The internal, light-redirecting structure can be configured of flexible sheet materials having the desired light reflecting characteristics and with fold lines and planar surfaces. Fabrication of the light redirecting structure as a flat, substantially void-free structure facilitates shipping and handling. Furthermore the use of flexible sheets renders the operative 3-dimensional, working configuration capable of being flexed to reduced diameters facilitating insertion of long lengths into a rigid carrier tube without frictional binding or damage to the opposed surfaces.

BRIEF DESCRIPTION OF THE DRAWINGS

FIG. 6A is an substantially void-free end view of another embodiment of the invention in a flat configuration.

FIG. 6B shows the structure of FIG. 6A assembled in its operative tubular form.

FIG. 7A is an, substantially void-free end view of another embodiment of the invention in a flat configuration.

FIG. 7B shows the structure of FIG. 7A assembled in its operative tubular form.

FIGS. 10A and 10B show the two component parts of the light-redirecting structure of another embodiment of the present invention in their flat configuration and adapted to be assembled as a substructure to be inserted into a rigid tubular carrier structure.

FIGS. 14A and 14B are two views in cross section at different points along the length of a light distributing tube illustrating another embodiment of the present invention.

DETAILED DESCRIPTION

Figure 1:
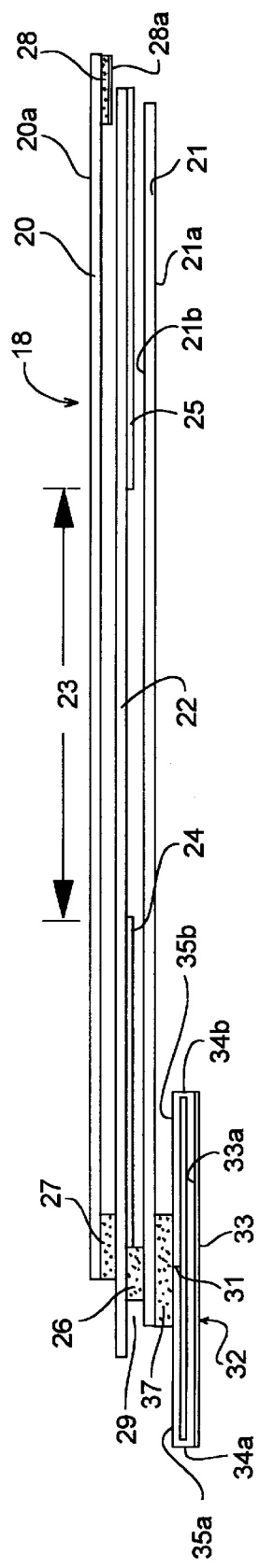
FIG. 1 is an end on view of all of the assembled components of a light distributing tube of the present invention in its flat, substantially void-free configuration for handling and shipping. In the drawing as in all of the drawings shown in this application, the scale of thicknesses of the respective films and tapes is necessarily greatly enlarged to enable the structure to be visualized and for identification of the component parts.
Figure 2:
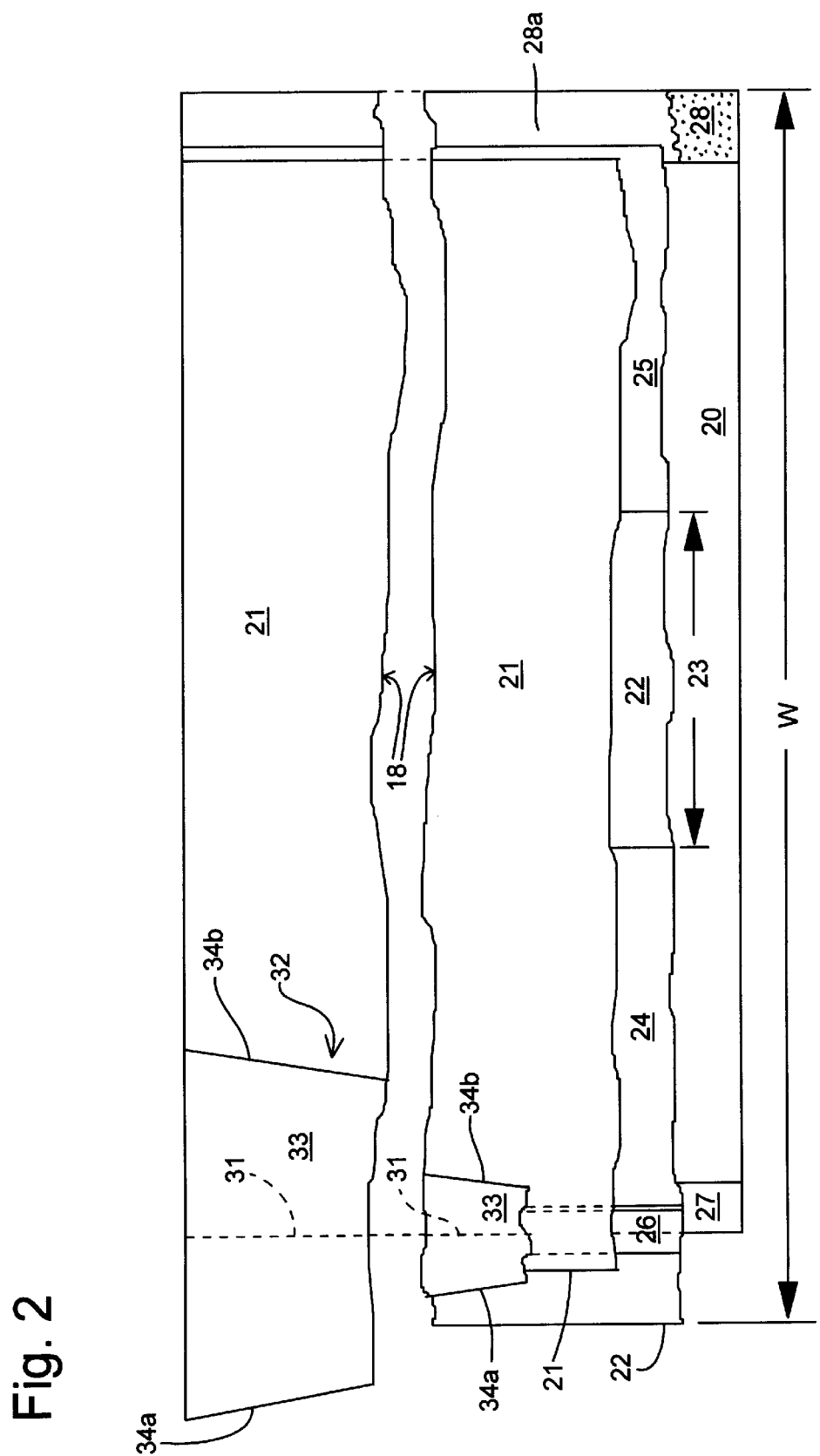
FIG. 2 is a plan view of the underside of the assembly of FIG. 1.

In FIGS. 1 and 2, one embodiment of the present invention is illustrated in a flat, substantially void-free configuration for efficient storage, handling and shipping. As used herein the term "substantially void-free" is meant to indicate that the amount of empty space within the described tubes when in a flattened configuration is substantially less than when in a tubular, operative configuration. This embodiment is advantageously designed to be subsequently formed, at the point of installation, for example, into its 3-dimensional, geometrically-complex, operating configuration shown in FIGS. 3, 4, and 5.

The assembly includes an outer ply 20 of flexible, clear sheet material, and an inner ply 21 of similar material. For optical purposes the inner surface 21a of the inner ply 21 is preferably glossy or polished. Both plies can be formed of polycarbonate, with U.V. stabilizing and abrasion resistant coatings on the exposed surfaces 20a and 21b if desired. Such sheet material is sold under the trademark Lexan® by the GE Company. The width W of the plies is dependent on the desired diameter of tube which can range upward to approximately 12 inches with single sheets of commercially available Lexan® or possibly more in the case of multi ply designs which could be adapted to formed into tubes in situ. The smallest and largest possible diameters are dependent on the thickness and resilience of the plies and the structural integrity of the final assembly. One advantage of the present invention is that it can be used to form tubes of very small diameter as will be described below but in such cases it is preferred that tubular supporting shells be formed by extrusions or other rigid-wall tube designs.

The length L of the plies in each section of the tube is governed by logistics, bending strength and the like. In general, it is preferred to fabricate the tubes in manageable sections of about 10 to 20 feet in length to be joined by joints such as those shown in the applicant's U.S. Pat. No. 5,475, 785, if longer lengths are desired in the finished installation.

Figure 3:
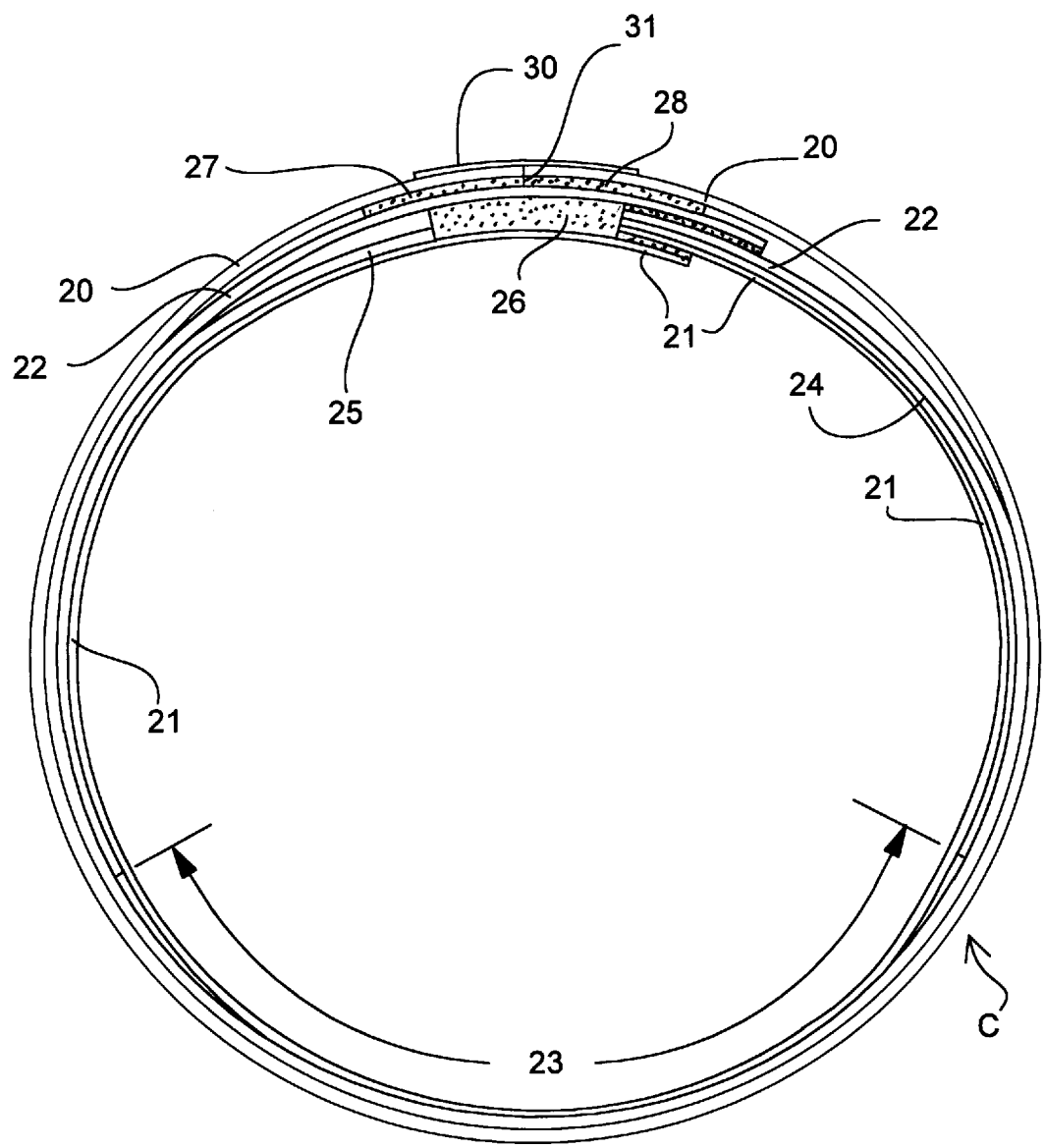
FIG. 3 is a view in cross section of the assembly of FIGS. 1 and 2 formed into its cylindrical, operative configuration as a light distributing tube taken on the line 3—3 of FIG. 4, which is close to the light source and does not include the 3-dimensional light-redirecting structure.
Figure 5A:
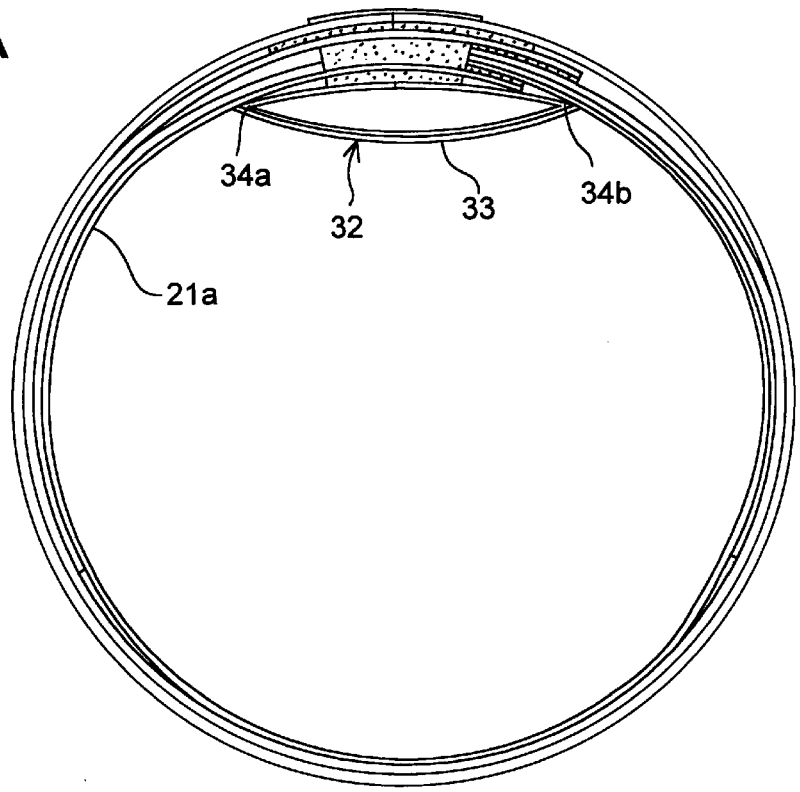
FIGS. 5A–5F are a succession of cross sectional views of the tube shown in FIG. 4 showing the changing configurations of the 3-dimensional light-redirecting structure within the cylindrical carrier.
Figure 5B:
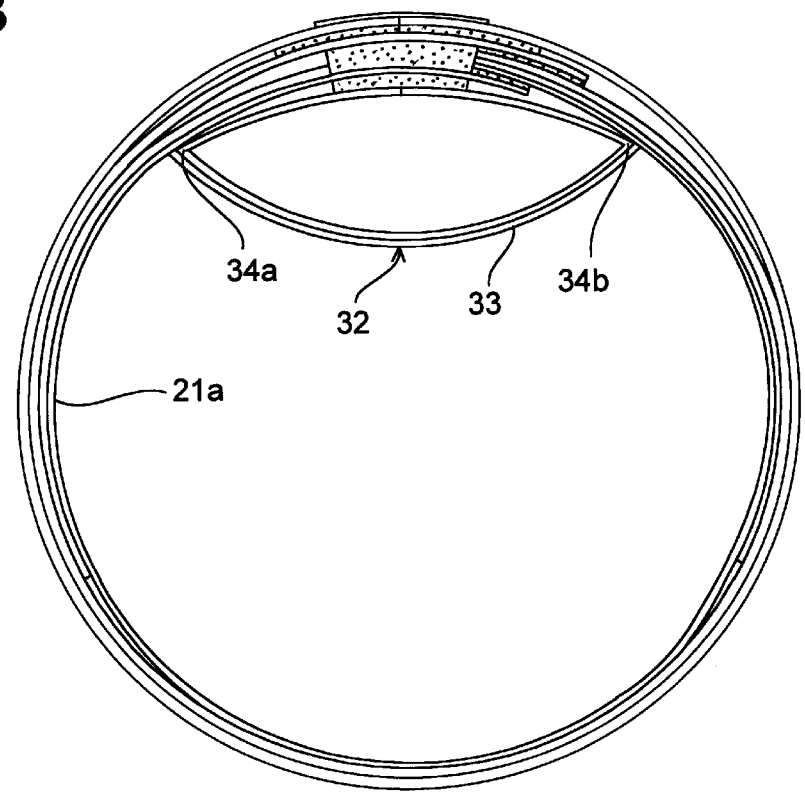
Figure 5C:
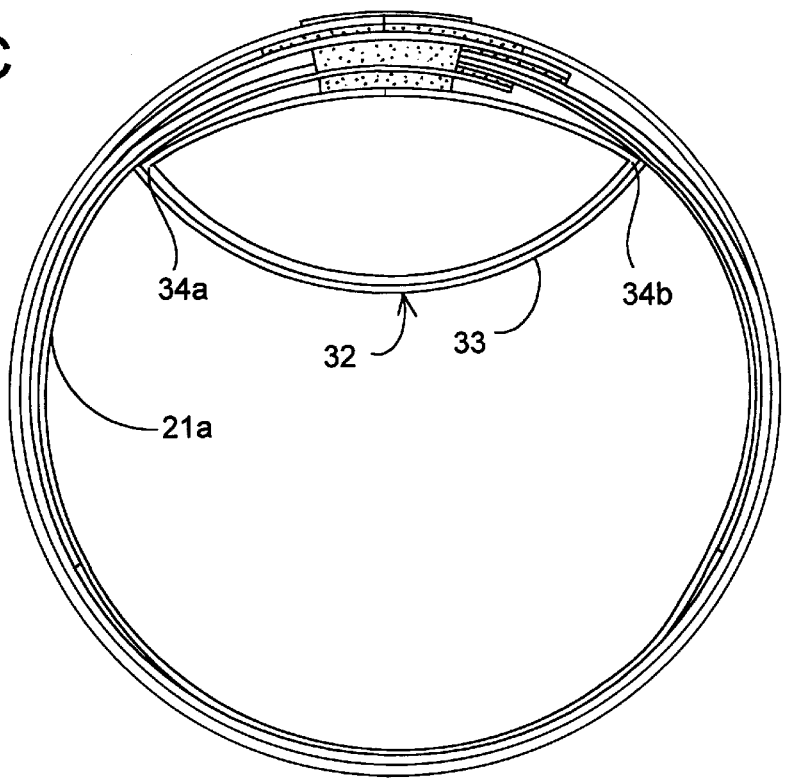
Figure 5D:
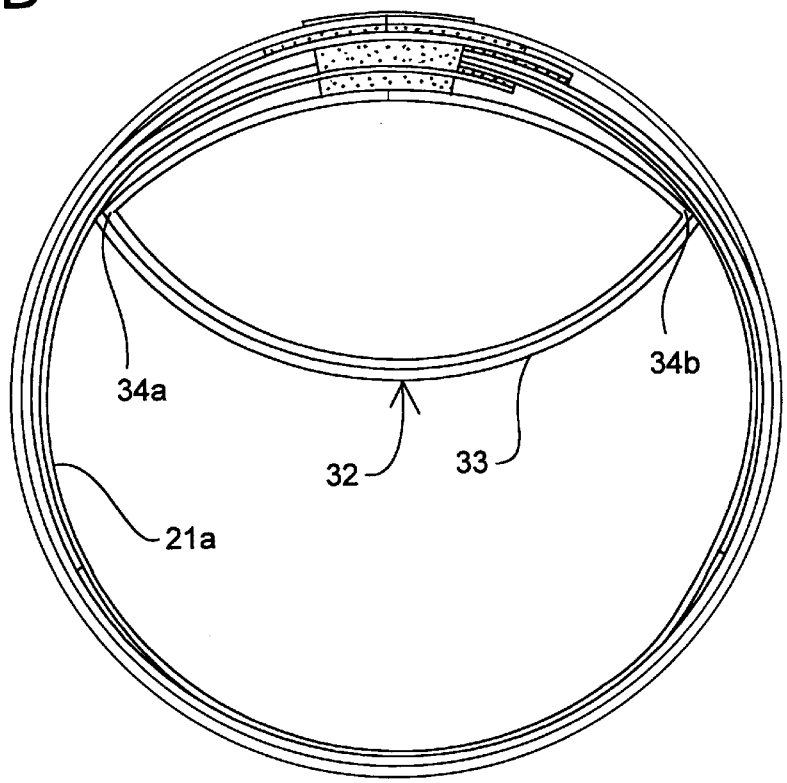
Figure 5E:
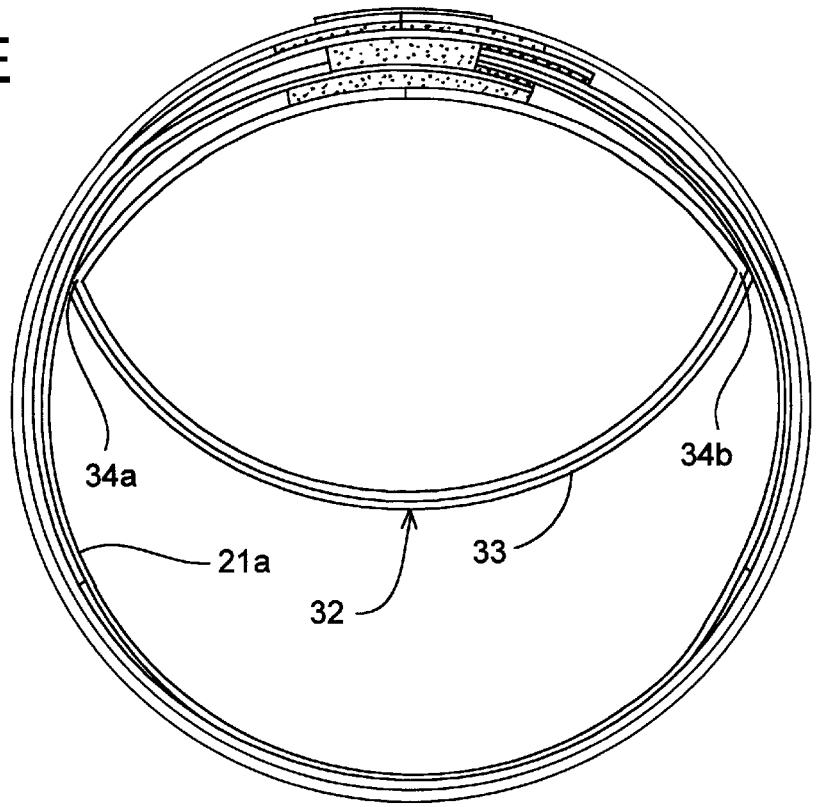
Figure 5F:
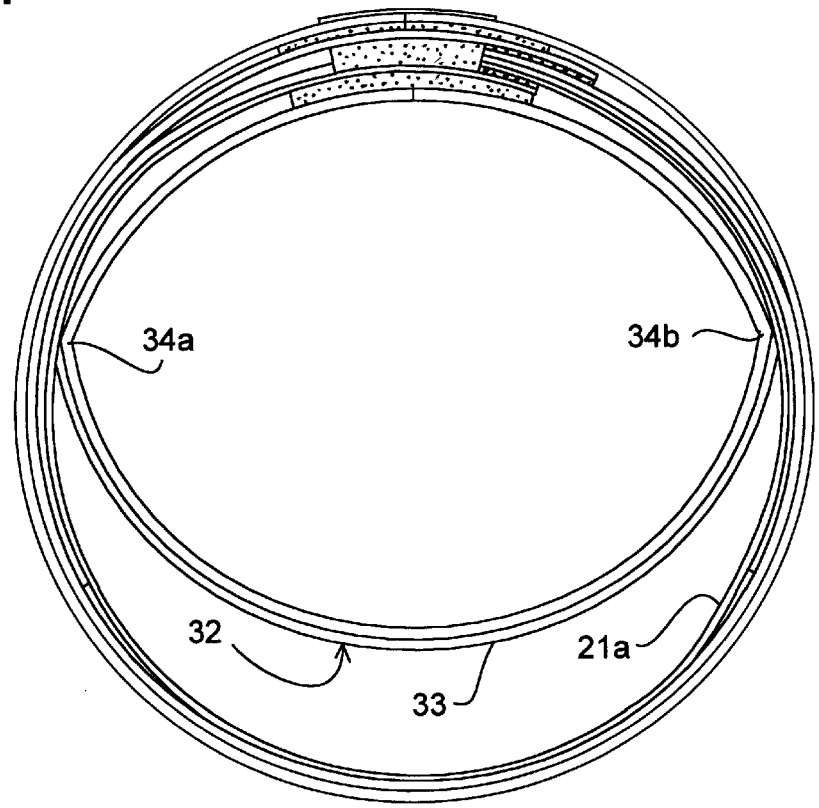

An optional, light-diffusing mid-ply 22 can be included to modify the light output through a window 23 (FIGS. 1 and 3). The window 23 is defined by the opening between the two halves 24 and 25 of a thin ply or layer of highly light scattering sheet material, such as Tyvek® sold by Dupont, sandwiched between the outer surface 21b of the inner ply 21 and the mid-ply 22. The plies are joined by connectors in the form of double sided adhesive tapes 26, 27 and 28, such as VHB tapes sold by 3M Company, preferably running the length of the tube section. As seen in FIGS. 1, 2 and 3, the connector 26 secures one edge of the inner ply 21 to the mid-ply 22. As seen in FIG. 3 the connectors 27 and 28 secure the outer ply 20 to the other side of the mid-ply 22 near one edge. The exposed side of the connector 28 as shown in FIGS. 1 and 2 is protected by a parting sheet 28a which is removed when the tube is formed by securing the unprotected surface of the tape 28 to the outer surfaces of the mid ply 22, as best seen in FIG. 3.

In FIGS. 1 and 2 (on the left hand side only) it will be seen that the inner ply 21 extends slightly beyond the connector tape 26 and the mid ply 22 extends slightly further to define, when the plies are rolled into a tube, a slot 29, the width of which is determined by the thickness of the connector tape 26, and into which the inner ply 21, the half 25 of the light reflecting layer, and the other edge of the mid-ply 22 are inserted. The assembly is held in place partly by the adhesive edge of the tape connector tape 26 and by the connector tapes 27 and 28 which couple the outer ply 20 at both edges to the mid-ply 22, as seen in FIG. 3. A connector tape 30, having adhesive on one side covers the seam 31 between the butted edges of the outer ply 20 and the butted edges of the connector tapes 27 and 28 and further secures the structural integrity of the tube assembly. The assembly as thus far described constitutes the tubular carrier shell C (FIGS. 3 and 5A through 5F) of the light distributing tube.

A light redirecting structure 32, which in this illustrated embodiment is spaced a certain distance from the light input end of the carrier shell (depending on the beam spread angle of the light beam, all as described below), is integrated with the carrier to be part of both the flat, substantially void-free structure of FIGS. 1 and 2 and the 3-dimensional structure of FIGS. 3, 4 and 5-A through 5-F. The illustrated structure 32, shown in FIGS. 5A–5F, includes a light scattering lamination 33 carried on a substrate 33a formed of polycarbonate with a rough or textured surface. One suitable substrate material is sold under the trademark Lexan® Suede by the GE Company. The lamination 33 is tightly mated to the rough or textured surface of the substrate 33a and is a thin, white matte film such as Scotchcal sold by the 3M Company. From the present invention, those skilled in the art will appreciate that a wide variety of light scattering surfaces can be utilized without departing from the present invention. For example, a coating or other light scattering material can be used.

The light scattering lamination 33, as best seen in plan view in FIG. 2 is preferably gradually tapered over its full length, most preferably symmetrically on both edges from a narrow width toward the end of the tube into which light is injected to a width at the distal end which is close to but not greater than one half of the internal circumference of the tubular carrier shell C for reasons described in greater detail below. The narrow end could in theory be pointed but as a practical matter has a finite width presenting an opening which is shielded by a tapered plug 33b to exclude light from entering the back side of the light-redirecting structure. The tapered plug 33b can also be used for aligning two successive light scattering sections as described below. As seen in FIGS. 5-A through 5-F the two side edges of the light lamination 33 extend substantially to the inner wall 21a of the carrier tube C. Also, its surface has preferably the curvature of the inside wall 21a, i.e., the radii of curvature are the same but reversed as to the top half of the carrier tube but in phase as to the lower half.

Because both edges of the light scattering lamination extend substantially to the inner wall of the tubular carrier shell C, the light redirecting structure and the upper portion of the carrier shell define a distorted ellipse which is distorted by pointed ends and begins as a prolate ellipse in FIG. 5-A in which x-axis is large in proportion to the y-axis. At a point approximately 45° around the inner wall of the tubular carrier shell (FIG. 5-D), it converts to an oblate ellipse in which the y-axis increases at an accelerated rate relative to the x-axis, thereby increasing the light scattering surface to a maximum as its y-axis approaches (but does not quite reach) the full diameter of the carrier shell (FIG. 5F). It will be appreciated that the light redirecting structure of this illustrated embodiment fills greater portions of the carrier at points successively further from the light source. While this illustrated embodiment generally illustrates a light redirecting structure having a bottom edge with a substantially constant slope, various applications may require adjustments to the slope, as well as the width and overall shape of the light redirecting structure, to meet objectives such as specifications directed to constant light output at various points along the light distributing tube.

Ideally, as the distorted ellipse eclipses progressively larger portions of the internal area (or air space) within the tube, light from the focussed source 36 (FIG. 4) is proportionately redirected out of the carrier shell via the window 23 in substantially the same proportion along its length.

The 3-dimensional geometry of the light scattering structure and its ability to be made substantially void-free for handling and shipping is made possible by its mounting within the structure. One such mounting arrangement is shown in FIGS. 1, 2, 4 and 5-A through 5-F.

In this embodiment, the substrate 33a is folded along its two longitudinal edges 34a and 34b to form two, symmetrical, tapered, flexible carrier portions 35a and 35b for the overall structure 32. The two carrier portions abut each other along a central seam 31 on either side of which they are secured to the inner ply 21 by a connector 37 in the form of a two-sided adhesive tape such as VHB tape of the 3M Company. The combined widths of the two carrier portions 35a and 35b is equal to the total width of the substrate 33a at any given point along their lengths (FIGS. 1 and 2) so that the structure will be substantially void-free in its flat configuration. When in the 3-dimensional configuration of FIGS. 4 and 5-A through 5-F, however, the two carrier portions 35a and 35b can be flexed into the circular curvature of the carrier tube, face to face with the inner ply 21. The substrate 33a, by virtue of the resilient bias of the fold lines 34a and 35b, will bow outward in reverse curvature to the carrier shell to form a 3-dimensional structure which will assume the graduated range of cross-sectional contours over its length as best seen in FIGS. 5-A through 5-F. Once bowed the structure becomes fully stable. The structure is, however, bi-stable, in that it can also assume a stable configuration in which the substrate 33a bows in close parallel relationship with the inner surface of tubular or cylindrical carrier shell. If no other means are provided, the desired, radially inwardly bowed configuration can be induced manually at the time the flat configuration is being converted from its flat to its circular configuration.

Figure 4:
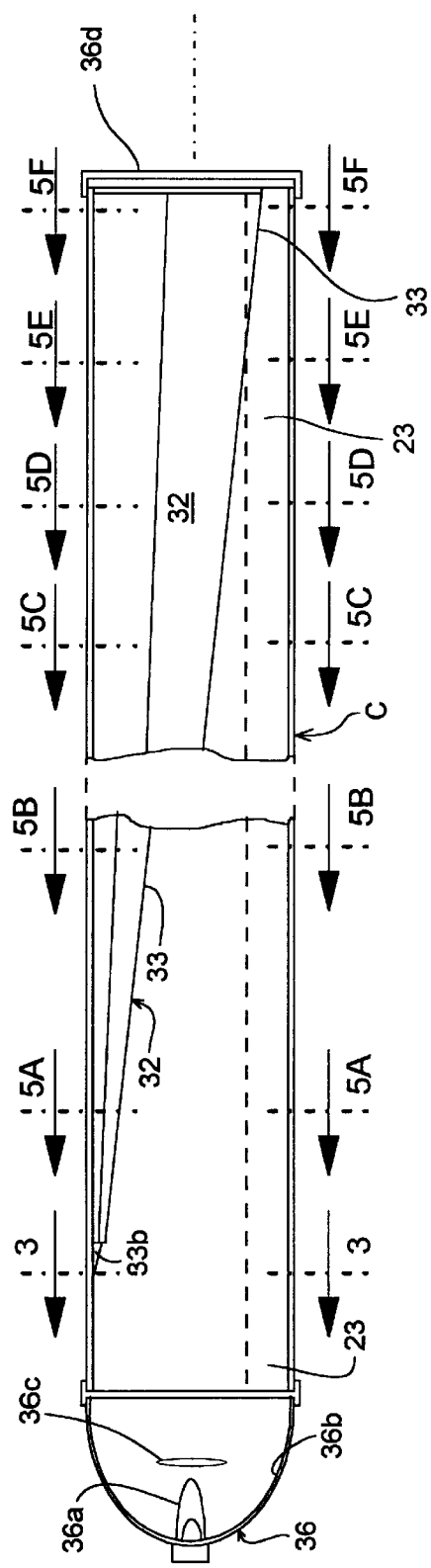
FIG. 4 is a view in longitudinal section of a light distributing tube and light source of one embodiment of the present invention.

As seen in FIG. 4, the light redirecting structure 32 of this embodiment begins a short distance, say 2 or 3 feet depending on tube diameter, from the substantially focused light source 36. As used herein, the term "substantially focussed light source" is used to indicate that a light source which directs a beam of light having a beam spread not greater than 12°, preferably not greater than 6°, and most preferably not greater than 4°. These beam spread angles, actually half-angles, exclude minor amounts of light outside the specified beam angle due to unintentional spillage. The spacing between the light source and the light redirecting structure 32 is desired since there is sufficient scattered light to create a substantially balanced light emission from the window 23 along that proximal length without additional redirected light from the structure 32. When the system is tuned properly, substantially the same amount of light will be redirected out the tube and through the window along the full length of the tube in a balanced, efficient system of light dispersed from a single source. It is desired that the light intensity does not vary more than 25 percent along the length of the tube. It will be understood that the sharper the focus of the light beam into the tube the closer will be the beginning of the light redirecting structure to the light input end of the tube. A source having a beam spread of 5 degrees (10° total) might, for example, dictate a section of tube up to as much as one quarter of the total length of the overall light distributing tube before the light redirecting structure begins. The scattering and bouncing of the angled light will be sufficient to effect light distribution from the front section of the tube. In extreme cases light output correction might be used to avoid a hot spot or excess of light emission. This can be done by light filtering or simply by narrowing the window by tapering the edges which define it. The closer the angle of spread of the beam approaches zero, the smaller the spacing of the light redirecting structure from the front or light input end. Thus in describing the light redirecting structure as being "adjacent" the light receiving end of the tube it will be understood the spacing can range from, say, a foot to ten or fifteen feet depending on the ability to focus light at the input end. In tests the invention has been found to be effective using light beam focussing at approximately 6 degrees and below.

In this connection it should be understood that non-light-distributing sections, e.g., cylindrical or conical, can be introduced between the light source per se and the beginning of the point of light distribution. Such non-light-distributing sections are known as light guides and can be comprised, for example, of a tubular length with internal mirrored surfaces, prism light guides and the like.

Fine tuning of system for light balance can be achieved by sharpening the focus and shape of the light beam from the source 36a to have relatively small angular divergence of the beam from its center line by using, for example, a precision parabolic reflector 36b behind and around the bulb 36a and adding a condensing lens 36c between the bulb and the tubular shell. In addition, fine tuning can be accomplished by tilting the light beam slightly downward or upward to direct more or less light toward the window 23 and render the beam more parallel to the tubular shell at the top. Also, the tubular shell itself can be formed as a truncated cone having a very gradual angle of divergence from the light input end to the distal end of the tube. This can be accomplished, for example, by forming gradual tapers on the plies which form the carrier shell of the light distributing tube. The surface of the light scattering film or lamination 33 can be modified by embossing shallow triangular grooves (not shown) in its surface to increase the amount of scattered light.

At the distal end of the tube where, in this embodiment, the light redirecting surface is larger than the window (FIGS. 5 and 6) the grooves can run longitudinally and occur primarily on the side walls. Transverse triangular grooves can also be used throughout the length of the surface or in selected portions thereof, as needed to augment redirection of the light. Also, the pitch angle of the light scattering lamination can be varied along the length of the tube, as can the radius of the transverse curvature.

As stated above, various methods for increasing or fine tuning the light scattering properties of the light redirecting surface can be employed to provide an optimum light distribution tube which is not dependent upon prismatic optical light film. Fine tuning or if desired, differing light distribution patterns can also be achieved by varying the angle of declivity of the light reflecting and scattering lamination 33 into the light beam at different sections of the tube. Thus reducing the angle to zero will minimize the light output (but not eliminate all light) and increasing it above the average angle will increase the output. Also, the rate of increase of the area of the surface 33 as it progresses down the tube from the light source can be reduced or increased in localized sections of the tube by simply varying the radius of transverse curvature of the surface 33, thus changing the light distribution pattern. This change is brought about by varying the spacing of the fold lines 34a and 34b. Also, by making structural changes the surface 33 can be converted from a curve to a polygonal cross sectional geometry of, for example, three planar surfaces the central one of which preferably directly faces the window 23.

When the light distributing tube comprises a plurality of sections joined end to end, various elements such as over-lapping joints, couplings, ring caps, and brackets, such as those shown in the applicant's U.S. Pat. No. 5,475,785 can be used. In addition, tapered aligning tongues or plugs 33b can be used for the precise alignment of the critical light-redirecting structure. Each section of the overall tube is unique as to the size and positioning of the light reflecting and scattering lamination 33 within the column. Tongues 33b uniquely sized for each coupling point bring about transitions between the coupled sections so that they are free of offsets and perturbations which can adversely affect light patterns. It will also be understood that the longitudinal tongue and groove as well as the longitudinal overlapping couplings of said Pat. No. 5,475,785 can all be applied to the present invention. The ratio of length to diameter (L/D) of any given tube is known as the aspect ratio, which is a useful parameter in understanding the capabilities of the present invention. New light bulb technology, such as the Light Drive 1000 sulphur bulb developed by Fusion Lighting Inc. of Rockville, Md., have resulted in extremely high intensity, single light sources that require, at least for interior applications, carefully designed light-distributing devices. A light distributing tube formed in accordance with the present invention 10 inches in diameter and approximately 66 feet in length would have an aspect ratio of approximately 80 and is a suitable match for a single sulphur light source. Such tube might for example be made in 4 sixteen foot 6 inch sections. Similarly, a 5" diameter tube having an aspect ratio of 80 would be approximately 33 feet in length, and would accommodate a single light source of much lower intensity and might also be made in four sections.

While the invention has been described above in a preferred embodiment, it can take other forms within the scope of the invention. For example, referring to FIGS. 6A and 6B, the light redirecting structure can take the form of a tapered strip 37 (corresponding to the laminated sheets 33 and 33a of FIG. 1) the longitudinal edges of which are joined directly to the inner surface of an original ply 38 which becomes the carrier shell for the light-distributing tube (FIG. 6B) when formed into a circle. The joint can be made by adhesive strips 39a and 39b or, alternatively mechanical connectors such as rivets. Desired resilient fold lines 40a and 40b can be preformed in the tapered strip 37 to bias the strip away from the ply 38 when the latter is formed into its operative configuration, e.g. the ellipsoid geometry.

FIGS. 7A and 7B, corresponding to FIGS. 6A and 6B, show another way of forming the light redirecting structure in which a tapered light reflecting strip 41 is prefolded along tapered lines 42a and 42b to form narrow edge strips 43a and 43b which are joined by adhesive connectors 44a and 44b to a flat ply 44 prior to the time the latter is formed into the circular carrier. As in the case of FIGS. 6A and 6B, the connectors 44a and 44b can be adhesive strips or mechanical couplings and the fold lines can provide a resilient bias urging the tapered strip away from the proximate surface of the carrier shell.

Figure 9B:
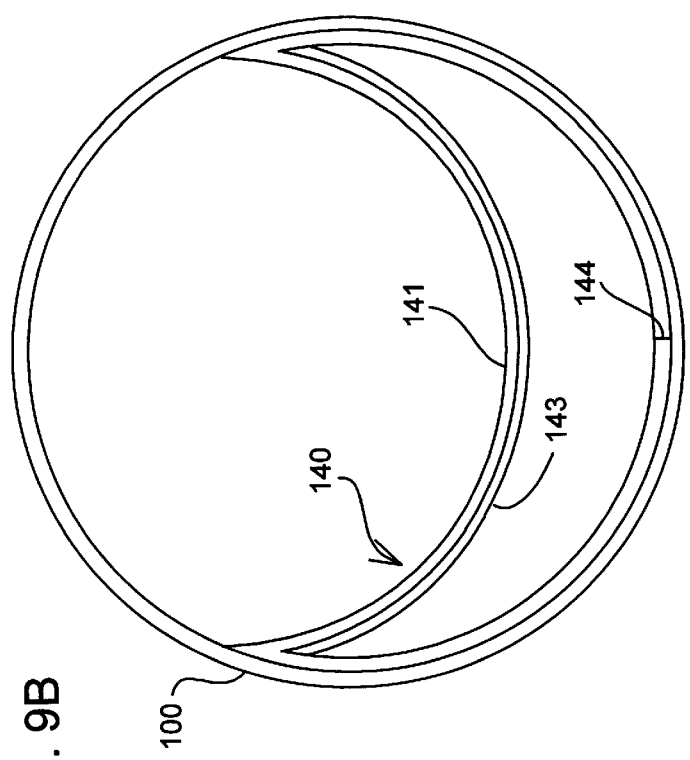
FIGS. 9A and 9B are cross-sectional views of an assembled operative tubular structure showing the configuration of the light-redirecting structure corresponding to lines 9A—9A and 9B—9B of FIG. 8.
Figure 9A:
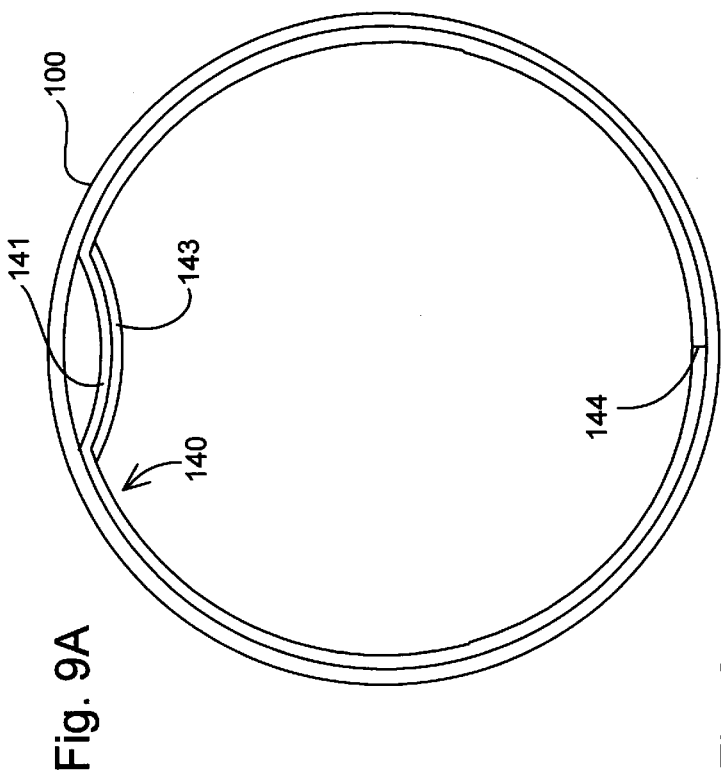
Figure 8:
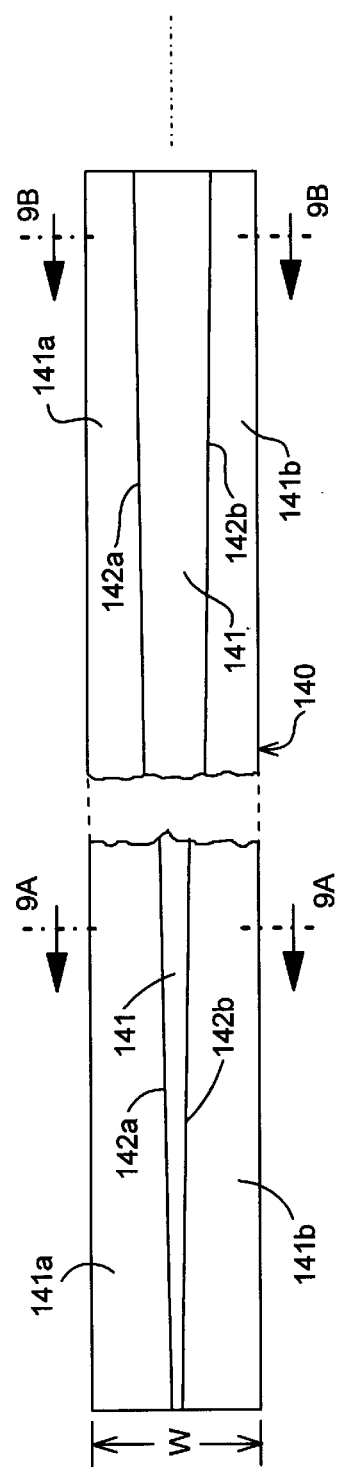
FIG. 8 is a plan view of another embodiment of a light-redirecting structure of the present invention, particularly useful as an insert into a preformed tubular carrier structure.

Another embodiment of the present invention is shown in FIGS. 8, 9A and 9B in which the tubular carrier shell 100 is a rigid, extruded tube of transparent or translucent material such as plastic or glass and the 3-dimensional internal light-redirecting surface structure 140 is designed to be slidably inserted into the carrier shell. Also, if desired the structure 140 can be formed first as a substantially void-free, stackable structure for shipping and handling, prior to insertion as described below.

In FIG. 8 the light redirecting structure 140 is shown as a single, flexible sheet of clear plastic, such as GE Lexan HPW, having a length corresponding to the length of the carrier tube and a uniform width W corresponding closely to the inside circumference of the carrier shell. In this embodiment, it is desired to have the longitudinal edges of the light redirecting structure 140 to abut each other, as indicated at 144 in FIGS. 9A and 9B. By abutting the edges of side legs 141*a* and 141*b,* the sheet 140 of the light redirecting structure is provided with greater stability within the carrier 100. As indicated, the outer surfaces of side legs 141*a* and 141*b* rest on the interior surface of the carrier 100. A tapered light redirecting surface 141 is defined in the center of the sheet by a pair of diverging fold lines 142*a* and 142*b* stressed or embossed into the surface to form a hinge, with a narrow, virtually pointed end adapted to be disposed toward the light source (not shown, but see FIG. 4) and the wide end toward the distal end of the carrier shell 100. The maximum width of the light redirecting surface of this embodiment is slightly less than one half of the internal circumference of the carrier shell. It will be appreciated that if the width of the light redirecting surface of this embodiment was equal to half of the internal circumference of the carrier shell, then the light redirecting surface would contact side legs 141*a* and 141*b* and create dark areas on the light distribution tube. For most applications, this would be undesirable. The two tapered, mirror-image side pieces 141*a* and 141*b* flank the tapered center of light redirecting surface 141, each side piece tapering from a width slightly less than half of the internal circumference to a minimum width slightly greater than one quarter of the internal circumference. The light scattering properties of the light-redirecting surface 141 are preferably augmented by a coating or lamination 143 such as a white matte film.

To insert the structure 140 into its carrier shell 100, the two side pieces 141*a* and 141*b* are, referring to FIGS. 9A and 9B, folded and flexed downwardly to abut edge to edge at 144. It will be understood that near the extreme right end (FIG. 9B), the structure will assume the shape of a sliver of a moon with the light redirecting surface 143 being disposed close to the abutted edges in substantially reverse curvature to the top half of the shell 100. The points of the "moon" can then be easily compressed slightly and held by suitable clamping means (not shown) for insertion into the carrier shell with sufficient clearance to preclude significant frictional sliding resistance. The light redirecting structure is then inserted into the carrier 100 from the end which will be closer to the light source. As the tapered light-redirecting surface narrows, the structure will come closer to the interior wall of the shell at the point of insertion and will fit more or less snugly when the insertion is complete. Release of the clamping means at the distal end allows the resiliency of the light redirecting structure 140 to restore the light redirecting structure 140 to the fully expanded operational configuration. Preferably, aligning and abutting the edges of sheet 140 will stabilize the structure 140 within the carrier. With the addition of a suitable end cap 36*d* (see FIG. 4) at the distal end and the attachment of a focussed light source such as the source 36 (FIG. 4) the assembly is complete.

It will be understood that the assembly can be made in multiple sections of tubular shells joined together, for example, using clear connectors or the silicone rings shown in Applicant's U.S. Pat. No. 5,483,119. In such case, each section will contain a light-redirecting structure unique to that section so that the intrusion of the light-redirecting structure into the space of the carrier shell will be uniform, with tapering coupling tongues mating the surfaces without perturbations, as described above.

Figure 11:
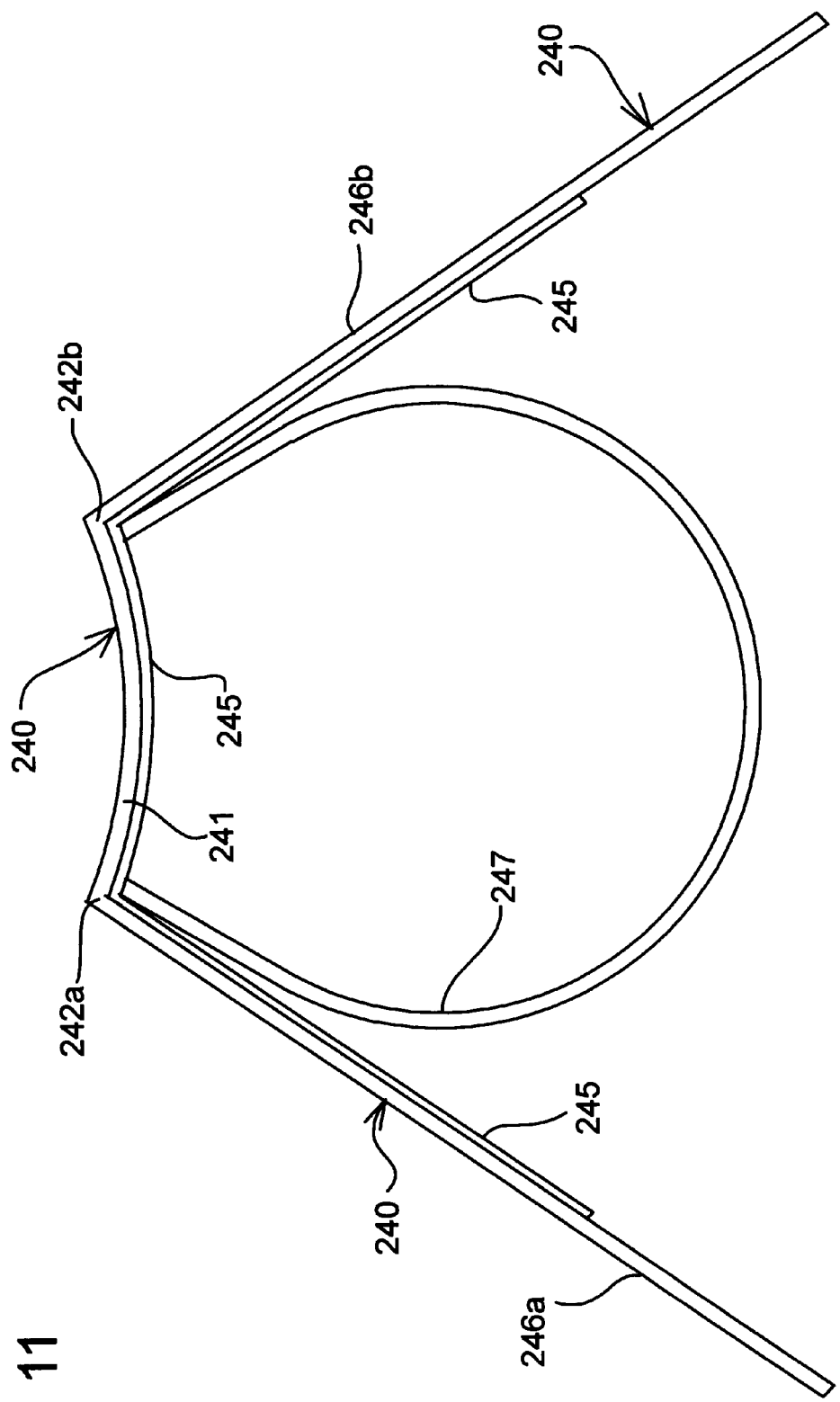
FIG. 11 shows the components of FIGS. 10A and 10B partly assembled.
Figure 13:
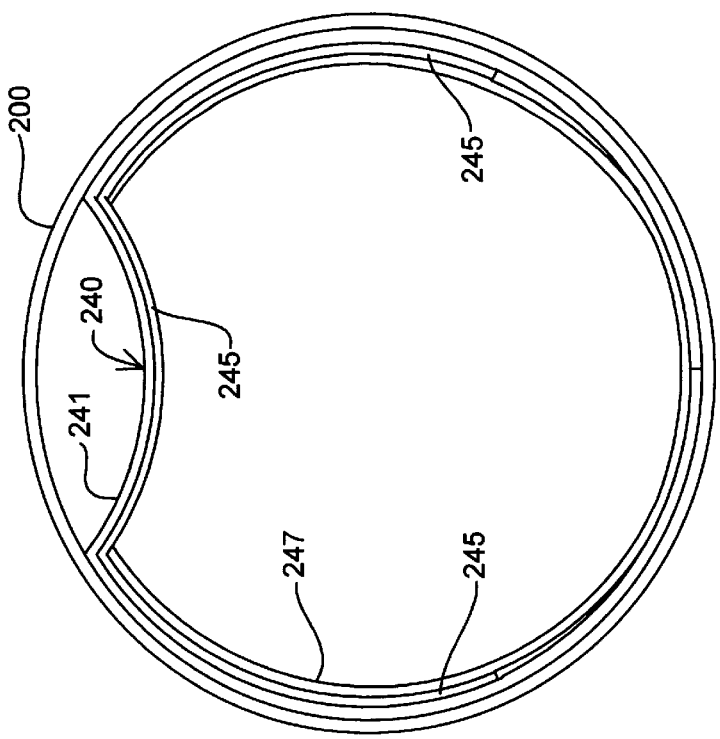
FIG. 13 shows the sub-assembly of FIG. 12 inserted into a rigid tube.
Figure 12:
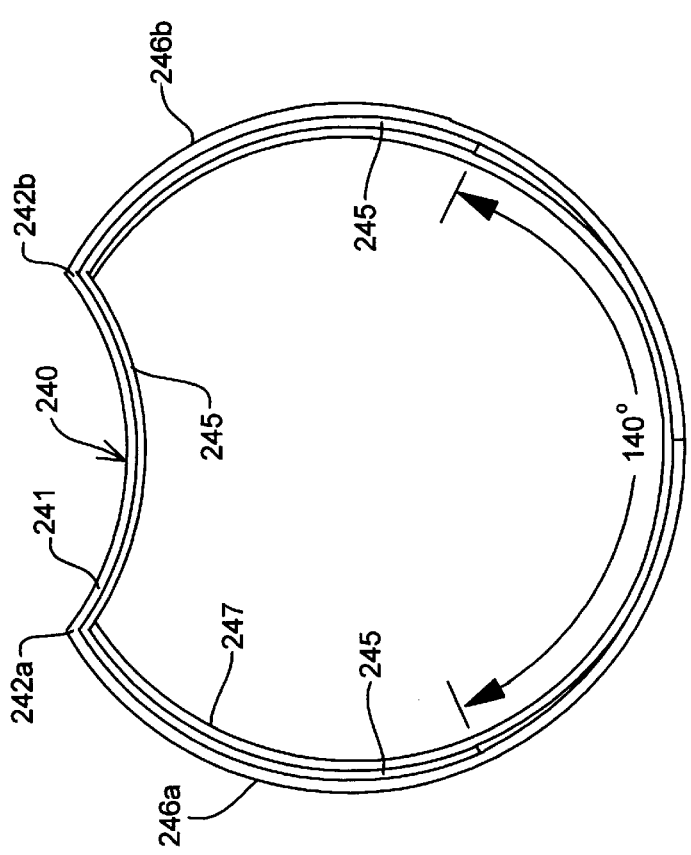
FIG. 12 shows the components of FIGS. 10A and 10B formed into a tubular form for insertion into a rigid carrier tube.

Referring to FIGS. 10A, 10B, 11, 12 and 13 there is shown an embodiment of the invention based on FIG. 8 but adding additional feature. The complete light-redirecting structure (FIGS. 12 and 13) includes a flexible sheet 240 of plastic of uniform width formed for example of Lexan Suede (as opposed to clear Lexan in FIG. 8) with tapered fold lines 242*a* and 242*b* formed therein to define a tapered light-redirecting surface 241 and flexible mirror-image side pieces 241*a* and 241*b*. Applied to the center of the structure 241 is a rectangular film 245 of light-reflecting material such as for example a matte white reflector film sold under the trademark Scotchcal. The width of the film 245 is such that, when centered within the rectangular sheet 240, it will not cover edge strips 246*a* and 246*b*. Thus when the structure is formed, and edge strips 246*a* and 246*b* abut, the edge of the film 245 will define a light-permeable window of approximately 140° as best seen in FIGS. 12 and 13.

The light-redirecting structure is completed as a sub-assembly by a tapered ply 247 of transparent material such as clear Lexan HP 92W made by G.E. The ply 247 has a width at the light input end, i.e., the left hand end as viewed in FIG. 10A and 10B, such that when added to the width of the central light-reflecting piece 241 it will be substantially equal to and in contact with the internal circumference of the suede material as seen in FIGS. 12 and 13. All of the film in FIG. 10B and the ply of FIG. 10A can be shipped flat and substantially void free.

When it is desired to assemble the finished product, the ply 247 is flexed as shown in FIG. 11 and its two edges 247*a* and 247*b* are seated in the fold lines 242*a* and 242*b*. After the sub-assembly is completed, side pieces 246*a* and 246*b* are brought around the outer side of the ply 247 (see FIG. 12) so that the edges abut in a seam 244. The sub-assembly can then be squeezed at its distal end by a suitable strap and inserted into the carrier shell 200 (FIG. 13) all as described above in reference to FIG. 9B.

If desired, the embodiments of FIGS. 10A, 10B, 11, 12 and 13 can be modified by substituting a film of reflecting material such as TYVEK for the matte white film 245 in all places except on the surface 241 between the fold lines 242*a* and 242*b* where the Scotchcal film is preferred.

Referring to FIGS. 14A and 14B another embodiment of the invention is illustrated in which the tubular carrier shell is formed of two arcuate sections 48 and 49 which together comprise a cylinder but individually are capable of being stacked for substantially void-free shipping and storage. The arcuate section 48, which can be formed of sheet metal or plastic, is flexible to accommodate stacking and resilient to afford the clamping force to anchor the smaller section 49 which can be formed of clear or translucent plastic to provide a light permeable window. C-clips 50 are formed along the longitudinal edge to engage internal lips 51 on the arcuate section 48.

The light-redirecting structure 52 corresponds to the structure 40 of FIGS. 8, 9A and 9B with the exception that the width W is narrowed so that the lateral edges, which abut in a seam 44 in FIGS. 9A and 9B, rest on the lip 51 of the shell section 48 in FIGS. 14A and 14B. This sub-assembly can be done before shipping, in which case the reversely-curved, light-reflecting and redirecting surface 52 at the top of the drawings, can be snap-toggled inward to match the concave curvature of the upper section 48 and later reversed when the light distributing tube assembly is installed. Alternatively, the entire sub-assembly can be shipped flat (or stacked in curvature) and inserted into the tube section 48 at the time of installation. It is preferred that inner surfaces of the window section 49 and the interior side walls of the sub-assembly 52 with the exception of the reversely curved, light redirecting surface be polished smooth and non-light absorbing. The reversely curved surface is most preferably textured and highly light scattering, all as described above.

EXAMPLE

Light distribution tube was formed according to the embodiment shown in FIGS. 1–5 having a 5¼ inch diameter. Four sections of tube were utilized to form a light distribution tube of 10 meters. A 12 volt, 100 watt halogen bulb light source having a 5 degree beam spread rating was located at one end at the other end was capped by an internally reflecting mirror end cap. The light redirecting structure was started at a point 2½ meters from the light source and extended to the distal end of the tube. The length of the curve intercepting the light beam was increased and had the following dimensions: ¾ of an inch at a point 2½ meters from the light source, 3¾ inches at a point 5 meters from the light source, 5¼ inches at a point 7½ meters from the light source and 6½ inches at the distal end of the tube. The slope of the bottom edge of the light redirecting structure was calculated to be 0.73 degrees for the first 2½ meters, i.e., from a point 2½ meters to a point 5 meters from the light source, 0.65 degrees for the remaining half of the light redirecting structure. The percentages of the internal area of the tube which were intercepted by the light redirecting structure at locations 2½ meters, 5 meters, 7½ meters and 10 meters from the light source were calculated to be 0.3%, 18.9%, 42.8% and 67% of the tube area.

Except for the area immediately adjacent to the light source, the light emitted from this tube was both very high indicating a good distribution efficiency, and relatively very constant. As measured with a Minolta illuminance meter T-1 at 12 positions along the tube length, measured in foot candles starting 25 cm from the light source end were: 170, 48, 32, 31, 27, 31, 28, 26, 27, 30, 26 and 30.

Therefore, from the present description it will be appreciated that the various embodiments of the present invention provide highly efficient, relatively inexpensive, simple to manufacture and convenient to ship light distribution tubes which do not rely upon the use of prismatic optical light film.

While the invention has been described above referring to preferred embodiments thereof, the invention should not be regarded as limited except as defined in the following claims.

What is claimed is:

1. A light distributing tube comprising:
   a tubular wall defining an elongated internal column to receive at one end a substantially focussed beam of light substantially aligned with the axis of the column;
   at least one light permeable window in the wall through which light is distributed;
   means for redirecting an internal light beam, within the column to divert light from the column through at least one window for area-illumination, said redirecting means comprising an elongated light scattering surface disposed at a gradual angle to the axis of the column from a point adjacent the light receiving end to a point adjacent the distal end of the tube to intercept the light beam over a major portion of the cross-sectional area of the tube.

2. A light distributing tube as set forth in claim 1, said light redirecting means comprising a tapered strip which is narrow adjacent the light receiving end of the tube and progressively wider approaching the distal end.

3. A light distributing tube as set forth in claim 2, said light reflecting surface of the tapered strip being convexly transversely curved within the tubular shell, with each of its edges being proximate to the wall defining the column thereby to eclipse progressively increasing portions of the light beam.

4. A light distributing tube as set forth in claim 2, said tubular wall comprising a rigid tube, said internal light redirecting means comprising a sub-assembly disposed within the rigid tube.

5. A light distributing tube as set forth in claim 4, said sub-assembly being radially compressible to reduce its circumference to be slidably inserted into the rigid tube.

6. A light distributing tube as set forth in claim 4 said rigid tube being formed of at least two sections.

7. A light distributing tube as set forth in claim 6, both of said sections being transversely curved and one of said sections comprising a light transmitting window.

8. A light distributing tube as set forth in claim 5 said sub-assembly comprising a transversely curved longitudinal tapered light redirecting portion.

9. A light distributing tube as set forth in claim 3, said column being cylindrical and said wall defining the column being smooth and glossy, said strip being convexly transversely curved on a radius substantially equal to the radius of curvature of the column.

10. A light distributing tube as set forth in claim 3, the width of the tapered strip at its widest point being no greater than one half of the internal circumference of the tube at its largest diameter.

11. A light distributing tube as set forth in claim 3,
    said tubular wall means being formed of at least one flexible, elongated substantially flat first sheet adapted to be rolled into an elongated tubular shell having a substantially circular cross section;
    said light redirecting means comprising a gently tapered, flexible, elongated flat second sheet having a maximum width no greater than one half of the internal circumference of said tubular wall means, said flat second sheet being adapted to overlie the first flat sheet in longitudinal face to face relationship prior to rolling into a tubular shell, thereby to form a substantially flat, substantially void-free structure;
    means to hold the lateral edges of the second sheet substantially immovably tangent to the first sheet in both the flattened and rolled configurations, whereby rolling the structure into its tubular configuration will cause the second sheet to bow in reverse curvature to the tubular shell to form a sloping, transversely convexly curved light-redirecting surface in the interior of the tubular shell which traverses the light beam over substantially the full length of the tubes and widens from the light-input end of the tube to the distal end; and
    means to secure the tubular configuration of the shell.

12. A light distributing tube as set forth in claim 11, the longitudinal edges of the second sheet each being directly secured to the surface of the first sheet.

13. A light distributing tube as set forth in claim 11, including means to bias the second sheet to assume, when the first sheet is rounded into its cylindrical configuration, a reverse curvature with respect to the opposing wall portion of the first sheet thereby to form a 3-dimensional structure within the tube eclipsing a portion of the column defined by the first sheet.

14. A light distributing tube as set forth in claim 11, said means to hold the lateral edges of the second sheet tangent to the first sheet comprising a second ply for the second sheet joined at its edges to the first ply and joined along its center line to the first sheet.

15. A light distributing tube as set forth in claim 14, said second ply of the second sheet comprising two substantially identical coplanar portions, each secured at their outer edges to the second sheet.

16. A light distributing tube as set forth in claim 11, said tubular wall comprising at least two plies of transparent sheet material, and a ply of transparent light diffusing material between the two plies and extending across the light-permeable window.

17. A light distributing tube as set forth in claim 16, including a ply of light reflecting material between said two plies of the tubular wall and extending at least between the edges of the window and the light redirecting means.

18. A light distributing tube as set forth in claim 17 including adhesive tape means to secure the plies in their tubular configuration.

19. A light distributing tube according to claim 1 wherein said redirecting means comprises a substrate and a light scattering layer.

20. A light distributing tube according to claim 1 wherein said redirecting means comprises a substrate and a light scattering coating.

21. In a method for forming a hollow light distributing tube with a geometrically complex light redirecting structure in the interior thereof, the steps of:

forming an elongated, flexible, substantially flat sheet capable of being rolled on its longitudinal axis to form at least part of a tubular shell;

forming an elongated, flexible, substantially flat, second sheet having a gentle longitudinal taper which is narrow at one end to a width at the other end which is substantially equal to one half of the maximum internal circumference of tubular shell;

placing the flat second sheet in longitudinal face to face relationship with the surface of the first sheet which is to become the internal surface of the tubular shell and axially aligned therewith;

holding the two longitudinal, tapering edges of the second sheet substantially tangent to the first sheet and immovable with respect thereto; and rolling the first sheet into its tubular configuration while causing the second sheet by virtue of its held edges to bow inward in a reverse curvature to intrude on the tubular air space defined by the first sheet, thereby to form a transversely convexly curved light redirecting surface which gently traverses the hollow space within the shell over substantially the full length thereof.

22. The method of claim 21, including the step of forming a light permeable window along the length of the tubular shell facing the convex surface of the second sheet.

23. The method of claim 22, including the steps of forming a light reflecting light scattering surface on said convex surface.

24. The method of claim 23, including the step of forming smooth light reflecting and light non-absorbing surfaces in the portion of the tubular shell between the light permeable window and the convex light redirecting surface.

25. A light distribution system comprising:

a source of substantially focussed light which directs a beam of light along a longitudinal axis, said beam having a beam spread of not greater than 6°; and means for redirecting said light comprising an elongated, light scattering surface which intercepts said light at an angle of not greater than 3° to said longitudinal axis.

* * * * *